United States Patent [19]

Volk

[11] Patent Number: 5,112,274
[45] Date of Patent: May 12, 1992

[54] ANKLE STRAP POULTRY TRUSSING DEVICE

[76] Inventor: Henry J. Volk, 1863 Anning, Turlock, Calif. 95380

[21] Appl. No.: 728,349
[22] Filed: Jul. 11, 1991
[51] Int. Cl.$^5$ ............................................. A22C 21/00
[52] U.S. Cl. ...................................... 452/174; 452/176
[58] Field of Search ................... 452/174, 176, 198, 11

[56] References Cited

U.S. PATENT DOCUMENTS

| | | | |
|---|---|---|---|
| 2,009,546 | 7/1935 | Iannen et al. | 452/11 |
| 3,213,487 | 10/1965 | Reynolds | 452/174 |
| 3,895,415 | 7/1975 | Volk | 452/174 |
| 4,015,573 | 10/1977 | Volk | 452/174 |
| 4,056,865 | 11/1977 | Cloyd | 452/174 |
| 4,739,538 | 4/1988 | Volk | 452/174 |

Primary Examiner—Willis Little

[57] ABSTRACT

A snap-on ankle strap poultry trussing device is provided having a plastic ankle strap which has a lower portion having an indent which extends upwardly between the exposed hocks of the carcass. The ankle strap is slipped over the exposed hocks and grasps the ankles of the poultry carcass and holds them together.

1 Claim, 1 Drawing Sheet

ANKLE STRAP POULTRY TRUSSING DEVICE

SUMMARY OF THE INVENTION

This invention relates to poultry trussing devices in general. More particularly, the invention relates to a plastic "snap-on" trussing device designed primarily for chickens, but which could be used with other poultry.

Prior art trussing devices include the wire device shown in U.S. Pat. No. 3,112,515. This prior art wire device is somewhat time consuming to apply to the carcass, and time consuming to remove from the carcass. The wire, itself, is somewhat corrosive and some of the basting ingredients used have adverse effects on the wire. The prior art also includes a plastic device shown in U.S. Pat. No. 4,056,865 which is somewhat similar to the wire device shown in U.S. Pat. No. 3,112,515 in that it has arms which are anchored inside the carcass of the fowl and a center portion which extends around the hocks and pulls the hocks downwardly toward the tail.

The present invention provides an ankle strap trussing device which may be more readily applied and more readily removed than prior art devices. The device is applied directly to the exposed hocks without the requirement of anchoring the device to the body of the poultry carcass.

It is a primary object of the invention to provide a "snap-on" ankle strap poultry trussing device which may be readily applied to and removed from the exposed hocks of a poultry carcass.

A further object of the invention is to provide a chicken trussing ankle strap which is slipped over the exposed hocks and which engages the ankles and holds the exposed hocks together.

Other objects and advantages of the invention will become apparent from the following description of the preferred embodiment and the drawings wherein:

DETAILED DESCRIPTION OF THE DRAWINGS

Figure 1:
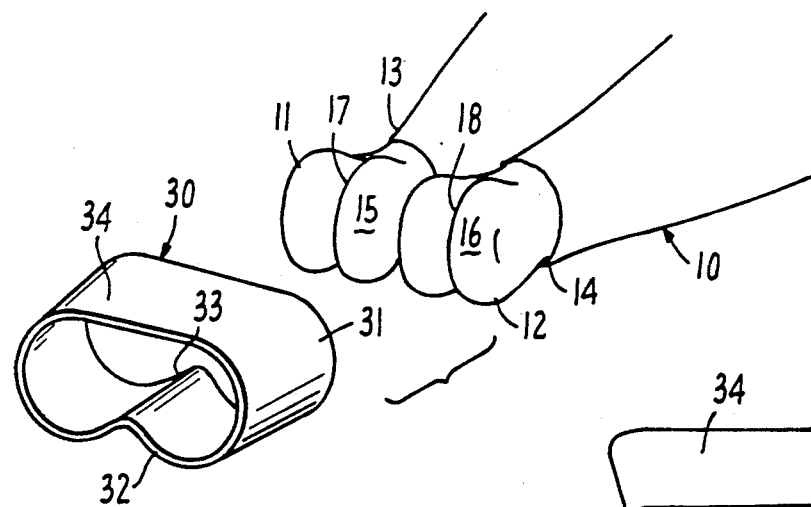
FIG. 1 is a perspective view showing a trussing device according to the present invention about to be applied to a pair of exposed hocks.
Figure 3:
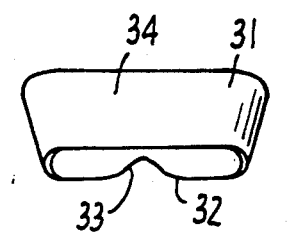
FIG. 3 is a top elevational view of the device before it is applied.

Referring to FIG. 1, the "snap-on" ankle strap trussing device 30 is shown prior to be being applied to a poultry carcass 10. In the embodiment shown in FIGS. 1 through 4, the trussing device 30 is shown being applied to a capon carcass 10. The carcass 10 has a pair of hocks 11 and 12 which extend from ankles 13 and 14, respectively. The hocks 11 and 12 have smooth bony surfaces 15 and 16 which extend in an upward direction and which have dimples 17 and 18 formed therein.

Hocks 11 and 12 are somewhat larger in size than the ankle areas 13 and 14. As shown best in FIG. 1, the "snap-on" trussing device 30 of the present invention has an ankle strap 31 which is adapted to be slipped over said exposed hocks 12 and 12 and to engage the ankles 13 and 14 and to hold the hocks adjacent each other as shown in FIG. 2.

Figure 2:
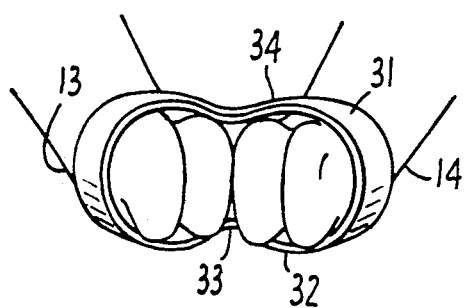
FIG. 2 is a front elevational view showing one embodiment of the trussing device of the present invention as applied to a capon carcass.
Figure 4:
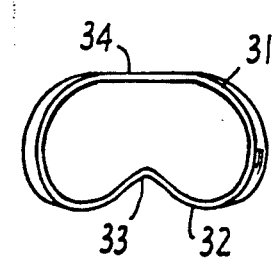
FIG. 4 is a front elevational view of the device before it is applied.

Ankle strap 31 has a lower portion 32, which engages the backside of the ankles, as shown in FIG. 2. The lower portion 32 of ankle strap 31 has an indent 33 formed therein which extends upwardly between the ankles 13 and 14, as shown best in FIG. 2.

Ankle strap 31 also has an upper portion 34 which extends across the top of the exposed hocks 11 and 12.

In applying the "snap-on" ankle strap, the upper portion 34 is pulled upwardly to slip over hocks 11 and 22 and is then allowed to resiliently grasp the ankles 13 and 14. The trussing device is made of plastic which has sufficient resilience to allow the device to be stretched over the hocks, but which has sufficient stiffness so that indent 33 retains its shape when applied to the carcass, as shown in FIG. 2.

Figure 5:
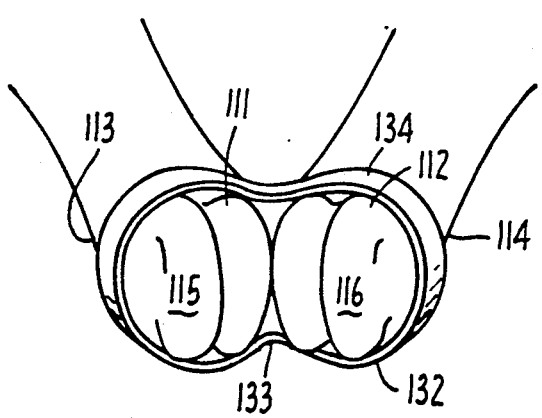
FIG. 5 is a front elevational view of an alternate embodiment of the invention as applied to a chicken carcass.
Figure 6:
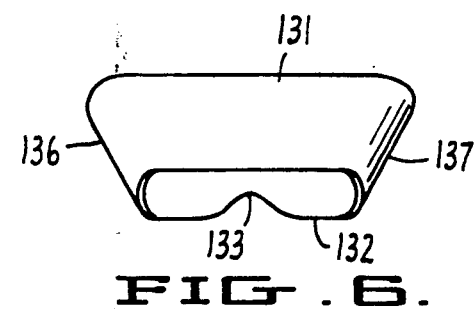
FIG. 6 is a top elevational view of the device shown in FIG. 5 before it is applied.
Figure 7:
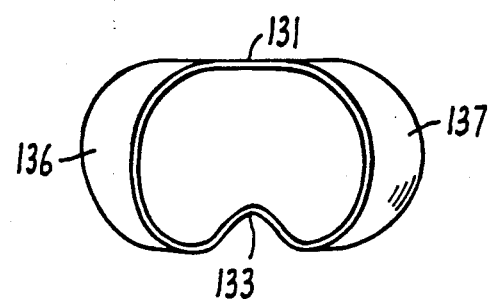
FIG. 7 is a front elevational view of the device shown in FIGS. 5 and 6.

An alternate embodiment of the invention is shown in FIGS. 5, 6 and 7 wherein the device is shown as applied to a chicken carcass, wherein the hocks are somewhat larger than the hocks of the capon carcass shown in FIGS. 1 through 4. The reference numerals are all increased by 100, but the design is essentially the same except the device shown in FIG. 5 is somewhat larger and the side walls 136 and 137 of the ankle strap extend a greater distance and grasp a larger area of ankles 113 and 114.

The device shown in the above drawings is used best in conjunction with capons and chickens. The device can be used with turkeys, but it is not as effective, partly because the turkey carcasses are larger and the exposed hocks have knobs protruding from the bottom side of the hocks which tend to interfere with the operation of the trussing device shown above.

I claim:

1. A poultry trussing device for use in conjunction with a poultry carcass to hold the legs of said carcass in a position wherein the hocks are adjacent each other and near the tail of the carcass, wherein the hocks are exposed and wherein each hock extends from an ankle and has a smooth, dimpled bony surface extending in an upward direction, said trussing device comprising:

an ankle strap adapted to be slipped over said exposed hocks and to engage the ankle of each leg and to hold said hocks adjacent each other, said ankle strap having a lower portion which engages the back side of said ankles, said lower portion having an indent formed therein which extends upwardly between said ankles.

* * * * *